United States Patent
Du (10) Patent No.: US 10,304,361 B2
(45) Date of Patent: May 28, 2019

(54) DISPLAY DEVICE AND METHOD OF CONTROLLING THE SAME, DEDICATED SPECTACLES AND DISPLAY SYSTEM

(71) Applicant: BOE Technology Group Co., Ltd., Beijing (CN)

(72) Inventor: Yufan Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 133 days.

(21) Appl. No.: 14/742,969

(22) Filed: Jun. 18, 2015

(65) Prior Publication Data

US 2016/0216556 A1    Jul. 28, 2016

(30) Foreign Application Priority Data

Jan. 27, 2015    (CN) .......................... 2015 1 0041233

(51) Int. Cl.
    *G09G 3/00*    (2006.01)
    *G02F 1/139*   (2006.01)
    *G02F 1/29*    (2006.01)

(52) U.S. Cl.
    CPC ............ *G09G 3/003* (2013.01); *G02F 1/1395* (2013.01); *G02F 1/1397* (2013.01); *G02F 1/29* (2013.01);
    (Continued)

(58) Field of Classification Search
    CPC ......... G02F 1/133528; G02F 1/133636; G02F 1/1333; G02F 1/134309; G02F 1/1347
    See application file for complete search history.

(56) References Cited

U.S. PATENT DOCUMENTS 7,768,718 B2    8/2010    Tomioka
8,848,116 B2    9/2014    He et al.
(Continued)

FOREIGN PATENT DOCUMENTS

CN    101135770 A    3/2008
CN    102338936 A    2/2012
(Continued)

OTHER PUBLICATIONS

The First Office Action in corresponding Chinese Priority Application No. 201510041233.0 dated Jan. 20, 2017.
(Continued)

*Primary Examiner* — Kwin Xie
(74) *Attorney, Agent, or Firm* — Westman, Champlin & Koehler, P.A.

(57) ABSTRACT

The present invention discloses a display device and a method of controlling the same, dedicated spectacles and a display system, thereby enabling switching between secrecy display and normal display. The display device comprises a display panel, in which two adjacent sub-pixels located in the same row are configured to display different image information, and which only displays one image of information when in a first display state displays at least two images of information when in a second display state; the display device further comprises a control panel located at a light exit side of the display panel and comprises first regions and second regions which are alternately arranged and is configured so that when the display panel is in the second display state, a polarization direction of light emitted from the display panel after passing through the first regions is different from that of light emitted from the display panel after the light passes through the second regions. The dedicated spectacles used with the display device are configured to only allow one of light passing through the first
(Continued)

regions and light passing through the second regions to pass therethrough.

18 Claims, 6 Drawing Sheets

(52) U.S. Cl.
CPC ............... *G09G 2300/0426* (2013.01); *G09G 2300/0478* (2013.01); *G09G 2320/068* (2013.01); *G09G 2358/00* (2013.01)

(56) References Cited

U.S. PATENT DOCUMENTS

| | | | |
|---|---|---|---|
| 9,223,144 B2 | 12/2015 | He et al. | |
| 9,671,629 B2 | 6/2017 | Li et al. | |
| 2005/0174529 A1* | 8/2005 | Fukushima | G02F 1/1323 349/197 |
| 2008/0049335 A1 | 2/2008 | Tomioka | |
| 2009/0096954 A1* | 4/2009 | Sakai | G02F 1/1323 349/61 |
| 2009/0102990 A1* | 4/2009 | Walton | G02F 1/1323 349/15 |
| 2009/0243971 A1* | 10/2009 | Uehara | G02F 1/1323 345/32 |
| 2009/0310064 A1* | 12/2009 | Choe | G02B 5/0242 349/64 |
| 2010/0110345 A1* | 5/2010 | Sakai | G02F 1/133634 349/96 |
| 2012/0019752 A1* | 1/2012 | He | G02B 27/22 349/117 |
| 2013/0155337 A1* | 6/2013 | Sugiyama | G02F 1/1347 349/15 |
| 2013/0335683 A1* | 12/2013 | Escuti | G02F 1/133528 349/96 |
| 2014/0340747 A1 | 11/2014 | He et al. | |
| 2016/0252758 A1* | 9/2016 | Lee | G02B 27/0101 348/135 |

FOREIGN PATENT DOCUMENTS

| | | |
|---|---|---|
| CN | 102360136 A | 2/2012 |
| CN | 102540550 A | 7/2012 |
| CN | 103293757 A | 9/2013 |
| KR | 20110007287 A | 1/2011 |
| WO | 2010/107247 A2 | 9/2010 |

OTHER PUBLICATIONS

Second Office Action, including Search Report, for Chinese Patent Application No. 201510041233.0, dated Oct. 16, 2017, 16 pages.

* cited by examiner

DISPLAY DEVICE AND METHOD OF CONTROLLING THE SAME, DEDICATED SPECTACLES AND DISPLAY SYSTEM

CROSS-REFERENCE TO RELATED APPLICATION

This Application is a non-provisional Application of Chinese Application No. CN 201510041233.0, filed Jan. 27, 2015, in Chinese, the contents of which are hereby incorporated by reference in their entirety.

BACKGROUND OF THE INVENTION

Field of the Invention

Embodiments of the present invention generally relate to the field of display technologies, and particularly, to a display device and a method of controlling the same, dedicated spectacles and a display system.

Description of the Related Art

Figure 1:
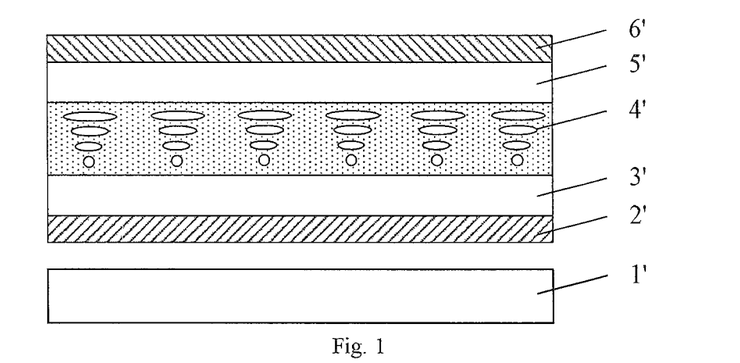
FIG. 1 is a sectional view showing an existing liquid crystal display device.

FIG. 1 shows a liquid crystal display device, comprising a backlight module 1', a lower polarizer 2', an array substrate 3', a liquid crystal layer 4', a color filter substrate 5' and an upper polarizer 6' arranged in order. Light emitted by the backlight module 1' becomes linearly polarized light after passing through the lower polarizer 2', then, a polarization direction of the linearly polarized light is changed after the light passes through the liquid crystal layer 4, and finally, the light passes through the upper polarizer 6' to exit from the display device, thereby desired image information is displayed.

With the development of network technologies, operations such as transfer, shopping or the like are performed through display device by more and more people. Thus, in order to avoid leakage of personal information, there is provided in prior arts a secrecy display device, in which a lower polarizer is only included and there is no upper polarizer. Since light emitted by the backlight module is homogeneous, light emitted from the liquid crystal layer is also homogeneous, accordingly, all of light emitted from sub-pixels of different colors is the same in intensity, so that naked eyes of a user can only see a white picture, and image information displayed by the display device can only be viewed by a user who wears dedicated spectacles comprising an upper polarizer.

It has been found by inventors that this secrecy display device can only perform secrecy display, is not switchable between the secrecy display and the normal display, and thus could not meet various requirements from users.

SUMMARY OF THE INVENTION

An object of embodiments of the present invention is to provide a display device and a method of controlling the same, dedicated spectacles and a display system, thereby enabling switching between the secrecy display and the normal display.

According to one aspect of the present invention, there is provided a display device, comprising a display panel, in which two adjacent sub-pixels located in the same row are configured to display different image information and from which light emitted is linearly polarized light, wherein, the display panel is configured to be switchable between a first display state and a second display state, so that the display panel only displays one image of information when the display panel is in the first display state, and the display panel displays at least two images of information when the display panel is in the second display state; the display device further comprises a control panel located at a light exit side of the display panel and configured to allow light emitted from the display panel to pass therethrough; and the control panel comprises first regions and second regions which are alternately arranged, and is configured so that when the display panel is in the second display state, a polarization direction of light emitted from the display panel after the light passes through the first regions is different from that of light emitted from the display panel after the light passes through the second regions.

In the above display device, the control panel may comprise a first substrate and a second substrate arranged to be opposed to each other, and a first liquid crystal layer between the first substrate and the second substrate, the first substrate is provided thereon with transparent first strip electrodes having the same width and equidistantly arranged to be parallel to one another, regions where the first strip electrodes are provided corresponding to the first regions, gaps between the first strip electrodes corresponding to the second regions; the second substrate is provided thereon a transparent plate electrode; and the control panel is configured so that when the display panel in the second display state, a voltage applied to the first strip electrodes is different from that applied to the plate electrode, thereby liquid crystal molecules of the first liquid crystal layer within the first regions are arranged with their macroaxes being perpendicular to planes where opposed surfaces of the first second substrates are located.

In the above display device, the control panel may further comprise second strip electrodes arranged within the gaps between the first strip electrodes, the second strip electrodes having the same width and being equidistantly arranged to be parallel to one another; and the control panel is further configured so that when the display panel is in the second display state, a voltage applied to the second strip electrodes is the same as that applied to the plate electrode, thereby liquid crystal molecules of the first liquid crystal layer within the second regions are arranged with their macroaxes are parallel to the planes.

In the above display device, an angle between an extending direction of the first strip electrodes and a row direction or a column direction of a pixel array of the display panel is $\beta$, where $0° \leq \beta \leq \text{Arctan}(9/2)$, and a direction in which the sub-pixels for displaying one image of information are arranged is parallel to the extending direction of the first strip electrodes.

In the above display device, the display panel may comprise a first polarizer, a second liquid crystal layer and a second polarizer arranged in order from its light entrance side to its light exit side, and the control panel may be a Twisted Nematic panel or an Optically Compensated Birefringence panel.

In the above display device, the control panel may further comprise a first quarter-wave plate located at its light exit side, and an angle between a direction of fast axis of the first quarter-wave plate and a direction of light transmission axis of the second polarizer is an acute angle.

In the above display device, the angle between the direction of fast axis of the first quarter-wave plate and the direction of light transmission axis of the second polarizer may be 45°, and a direction to which the direction of fast axis of the first quarter-wave plate is rotated clockwise or counterclockwise by 45° may be the direction of light transmission axis of the second polarizer.

In the above display device, one of the at least two images of information may be used as image information for secrecy display, and other image information may be used as interference image information.

In the above display device, the display device may have a plurality of visible areas, and the respective image information respectively correspond to different visible areas.

In the above display device according to embodiments of the present invention, the display panel only displays one image of information when the display panel is in the first display state, and the control panel is configured to allow light emitted from the display panel to pass therethrough, so that image information displayed by the display device can be identified by a user in his/her naked eye state, thereby normal display is achieved by the display device; and, the display panel displays at least two images of information when the display panel is in the second display state, and two adjacent sub-pixels located in the same row are configured to display different image information, so that no image information displayed by the display device can be identified by a user in his/her naked eye state. When the user wears dedicated spectacles, only one of light passing through the first regions and light passing through the second regions can pass through the dedicated spectacles; in such a case, a combination of the dedicated spectacles and the control panel functions as a grating, so that one image of information can be viewed by the user within a certain visible area, thereby achieving secrecy display. Thus, the display device is switchable between the secrecy display and the normal display by switching the display panel between the first display state and the second display state.

Embodiments of the present invention further provide dedicated spectacles used with the display device as described above, wherein the dedicated spectacles are configured to only allow one of light passing through the first regions and light passing through the second regions to pass therethrough.

In the above dedicated spectacles, when the display panel comprises a first polarizer, a second liquid crystal layer and a second polarizer arranged in order from its light entrance side to its light exit side, and the control panel is a Twisted Nematic panel, the dedicated spectacles comprise a third polarizer with a direction of light transmission axis being perpendicular to a direction of light transmission axis of the second polarizer.

In the above dedicated spectacles, when the display panel comprises a first polarizer, a second liquid crystal layer and a second polarizer arranged in order from its light entrance side to its light exit side, the control panel is a Twisted Nematic panel and comprises a first quarter-wave plate located at its light exit side, and a direction to which a direction of fast axis of the first quarter-wave plate is rotated clockwise by 45° is a direction of light transmission axis of the second polarizer, the dedicated spectacles comprise a second quarter-wave plate and a third polarizer arranged in order from its light entrance side to its light exit side, and a direction to which a direction of fast axis of the second quarter-wave plate is rotated counterclockwise by 45° is a direction of light transmission axis of the third polarizer.

In the above dedicated spectacles, when the display panel comprises a first polarizer, a second liquid crystal layer and a second polarizer arranged in order from its light entrance side to its light exit side, the control panel is a Twisted Nematic panel and comprises a first quarter-wave plate located at its light exit side, and a direction to which a direction of fast axis of the first quarter-wave plate is rotated counterclockwise by 45° is a direction of light transmission axis of the second polarizer, the dedicated spectacles comprise a second quarter-wave plate and a third polarizer arranged in order from its light entrance side to its light exit side, and a direction to which a direction of fast axis of the second quarter-wave plate is rotated clockwise by 45° is a direction of light transmission axis of the third polarizer.

In the above dedicated spectacles, when the display panel comprises a first polarizer, a second liquid crystal layer and a second polarizer arranged in order from its light entrance side to its light exit side, and the control panel is an Optically Compensated Birefringence panel, the dedicated spectacles comprise a third polarizer with a direction of light transmission axis being parallel to a direction of light transmission axis of the second polarizer.

In the above dedicated spectacles, when the display panel comprises a first polarizer, a second liquid crystal layer and a second polarizer arranged in order from its light entrance side to its light exit side, the control panel is an Optically Compensated Birefringence panel and comprises a first quarter-wave plate at its light exit side, and a direction to which a direction of fast axis of first quarter-wave plate is rotated clockwise by 45° is a direction of light transmission axis of the second polarizer, the dedicated spectacles comprise a second quarter-wave plate and a third polarizer arranged in order from its light entrance side to its light exit side, and a direction to which a direction of fast axis of the second quarter-wave plate is rotated clockwise by 45° is a direction of light transmission axis of the third polarizer.

In the above dedicated spectacles, when the display panel comprises a first polarizer, a second liquid crystal layer and a second polarizer arranged in order from its light entrance side to its light exit side, the control panel is an Optically Compensated Birefringence panel and comprises a first quarter-wave plate located at its light exit side, and a direction to which a direction of fast axis of first quarter-wave plate is rotated counterclockwise by 45° is a direction of light transmission axis of the second polarizer, the dedicated spectacles comprise a second quarter-wave plate and a third polarizer arranged in order from its light entrance side to its light exit side, and a direction to which a direction of fast axis of the second quarter-wave plate is rotated counterclockwise by 45° is a direction of light transmission axis of the third polarizer.

In the above dedicated spectacles provided according the embodiments of the present invention and used with the display device as described above, when the display panel displays at least two images of information, and when light passing through the first and second regions of the control panel and having different polarization direction reaches the dedicated spectacles, only one of light passing through the first regions and light passing through the second regions is allowed to pass through the dedicated spectacles, so that one image of information can be viewed by a user within a certain visible area by means of the dedicated spectacles, thereby achieving secrecy display.

Embodiments of the present invention further provide a display system, comprising the display device and the dedicated spectacles as described above.

In the above display system provided according to the embodiments of the present invention, since the display system comprises the display device and the dedicated spectacles as described above, the display panel only displays one image of information when the display panel is in the first display state, and the control panel is configured to allow light emitted from the display panel to pass therethrough, so that image information displayed by the display device can be identified by a user in his/her naked eye state, thereby normal display is achieved by the display device; the display panel displays at least two images of information when the display panel is in the second display state, and two adjacent sub-pixels located in the same row are configured to display different image information, so that no image information displayed by the display device can be identified by a user in his/her naked eye state; when the user wears the dedicated spectacles, one of light passing through the first regions and light passing through the second regions can pass through the dedicated spectacles; in such a case, a combination of the dedicated spectacles and the control panel functions as a grating, so that one image of information can be viewed by the user within a certain visible area, thereby achieving secrecy display. Thus, the display device can be switched between the secrecy display and the normal display by switching the display panel between the first display state and the second display state.

Embodiments of the present invention further provide a method of controlling the above display device, comprising: controlling the display panel to only display one image of information when the display panel is in the first display state, so that the display device performs normal display; when the display panel is in the second display state, controlling the display panel to display at least two images of information, and controlling the control panel so that a polarization direction of light emitted from the display panel after the light passes through the first regions is different from that of light emitted from the display panel after the light passes through the second regions, thereby the display device performs secrecy display.

In the above method, since the display device performs normal display when the display panel is in the first display state, and performs secrecy display when the display panel is in the second display state, thereby enabling the display device to be switchable between the secrecy display and the normal display.

BRIEF DESCRIPTION OF THE DRAWINGS

Accompanying drawings, which are used when describing embodiments of the present invention or prior arts, will be briefly described in order to illustrate technique solutions in the embodiments of the present invention or in prior arts more clearly. Obviously, the accompanying drawings described in the following description are only to illustrate some embodiments of the present invention, and other drawings may be obtained by those skilled in the art according to these accompanying drawings without creative work.

REFERENCE NUMBERS

| 1-display panel; | 11-first polarizer; | 12-second liquid crystal layer; |
| --- | --- | --- |
| 13-second polarizer; | 2-control panel; | 21-first region; |
| 22-second region; | 23-first substrate; | 24-second substrate; |
| 25-first liquid crystal layer; | 26-first strip electrode; | 27-plate electrode; |
| 28-second strip electrode; | 29-first quarter-wave plate; | 3-dedicated spectacles; |
| 31-third polarizer; | 32-second quarter-wave plate. | |

DETAILED DESCRIPTION OF THE EMBODIMENTS

Technique solution in embodiments of the present invention will be described hereinafter in detail with reference to the attached drawings. Obviously, the described embodiments are only some, rather than all, of embodiments of the present invention. Based on the embodiments of the present invention, all of other embodiments obtained by those skilled in the art without any creative work will fall within the scope of the present invention.

Figure 2:
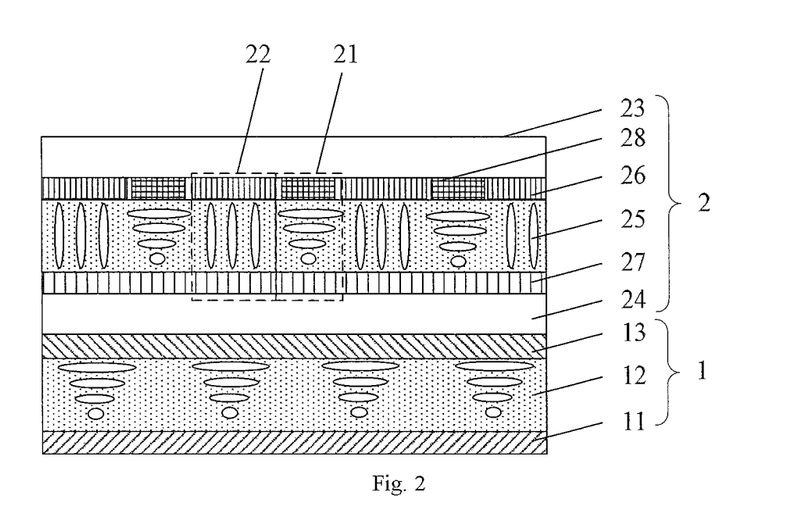
FIG. 2 is a sectional view showing a display device according to embodiments of the present invention.

Embodiments of the present invention provide a display device. As shown in FIG. 2, the display device comprises a display panel 1, in which two adjacent sub-pixels located in the same row are configured to display different image information and from which light emitted is linearly polarized light; the display panel 1 includes a first display state and a second display state; the display panel 1 only displays one image of information when the display panel 1 is in the first display state; the display panel 1 displays at least two images of information when the display panel 1 is in the second display state; the display device further comprises a control panel 2 located at a light exit side of the display panel 1 and configured to allow light emitted from the display panel 1 to pass therethrough; and, the control panel 2 comprises first regions 21 and second regions 22 which are alternately arranged, and is configured so that when the display panel 1 is in the second display state, a polarization direction of light emitted from the display panel 1 after the light passes through the first regions 21 is different from that of light emitted from the display panel 1 after the light passes through the second regions 22.

When the display panel 1 is in first display state, the display device is used for normal display, the display panel 1 only display one image of information, and the control panel 2 enables light emitted from the display panel 1 to pass therethrough, so that the image information displayed by the display device can be identified by a user.

Figure 3:
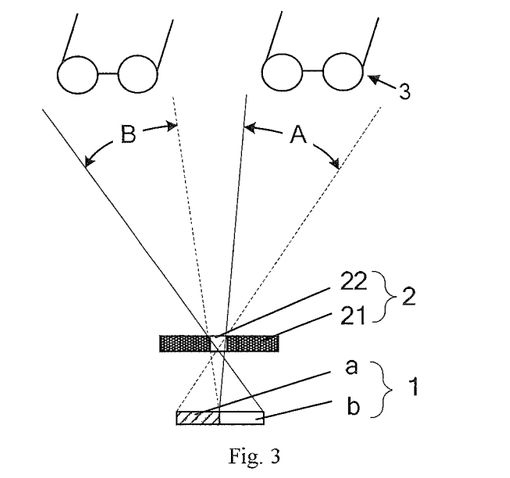
FIG. 3 is a principle diagram showing a display device according to embodiments of the present invention.

When the display panel 1 is in the second display state, the display device is used for secrecy display, and the display panel 1 displays at least two images of information; for example, when any one of the at least two images of information is used as image information for the secrecy display, other image information may be used as interference image information; when a user is in a naked eye state, since two adjacent sub-pixels located in the same row are configured to display different image information, the user cannot identify any image information; when the user wears dedicated spectacles, only one of light passing through the first regions 21 and light passing through the second regions 22 can pass through the dedicated spectacles. For example, as shown in FIG. 3, two adjacent sub-pixels a and b of the display panel 1 are configured to display different image information, and the dedicated spectacles 3 only allow light passing through the second regions 22 of the control panel 2 to pass therethrough; in such as case, a combination of the dedicated spectacles 3 and the control panel 2 functions as a grating. If the image information displayed by the sub-pixels a is used as image information for secrecy display, only light from the sub-pixel a for displaying the image information for the secrecy display can pass through the dedicated spectacles 3 to reach eyes of a user when the user is within a visible area A, so that the user can only see the image information for secrecy display; and, when the user is within a visible area B, the light from the sub-pixel a for displaying the image information for the secrecy display cannot reach the user, while light from the sub-pixel b for displaying other interference image information can reach the user, thereby achieving confidentiality. Further, in order to improve the confidentiality of the image information, the display panel 1 may display more than two images of information, so that the number of the interference image information is increased, and respective image information corresponds to different visible area, thus the user can only see one image of information when being within a certain visible area.

In the above display device provided according to embodiments of the present invention, the display panel only displays one image of information when the display panel is in the first display state, and the control panel is configured to allow light emitted from the display panel to pass therethrough, so that image information displayed by the display device can be identified by a user in his/her naked eye state, thereby normal display is achieved by the display device; the display panel displays at least two images of information when the display panel is in the second display state, and two adjacent sub-pixels located in the same row are configured to display different image information, so that no image information displayed by the display device is identified by a user in his/her naked eye state; when the user wears dedicated spectacles, only one of light passing through the first regions and light passing through the second regions can pass through the dedicated spectacles; in such a case, a combination of the dedicated spectacles and the control panel functions as a grating, so that one image of information can be viewed by the user within a certain visible area, thereby achieving secrecy display. Thus, the display device is switchable between the secrecy display and the normal display by switching the display panel between the first display state and the second display state.

In one example, as shown in FIG. 2, the control panel 2 comprises a first substrate 23 and a second substrate 24 arranged to be opposed to each other, and a first liquid crystal layer 25 between the first substrate 23 and the second substrate 24, the first substrate 23 is provided thereon with transparent first strip electrodes 26 having the same width and equidistantly arranged to be parallel to one another; the second substrate 24 is provided thereon a transparent plate electrode 27; regions where the first strip electrodes 26 are provided correspond to the first regions 21, and gaps between the first strip electrodes 26 or the first regions 21 correspond to the second regions 22; when the display panel 1 in the second display state, a voltage applied to the first strip electrodes 26 is different from that applied to the plate electrode 27, thereby liquid crystal molecules of the first liquid crystal layer 25 within the first regions 21 are arranged with their macroaxes being perpendicular to the control panel, that is, being perpendicular to planes where opposed surfaces of the first substrate 23 and the second substrate 24 are located, and liquid crystal molecules of the first liquid crystal layer 25 within the second regions 22 are arranged in such a state that their macroaxes are held to be parallel to the control panel 2, that is, to be parallel to the planes where opposed surfaces of the first substrate 23 and the second substrate 24 are located, so that a polarization direction of linearly polarized light passing through the first regions 21 of the control panel 2 is different from a polarization direction of linearly polarized light passing through the second regions 22 of the control panel 2.

Further, in order that the liquid crystal molecules of the first liquid crystal layer 25 within the second regions 22 are arranged in the state that their macroaxes are held to be parallel to the control panel 2, the control panel 2 further comprises second strip electrodes 28 arranged within the gaps between the first strip electrodes 26, the second strip electrodes 28 have the same width and are equidistantly arranged to be parallel to one another, and a voltage applied to the second strip electrodes 28 is the same as that applied to the plate electrode 27.

Figure 4:
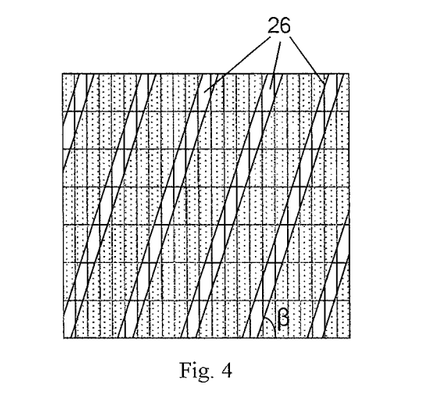
FIG. 4 is a plan view showing a display device according to embodiments of the present invention.

Preferably, as shown in FIG. 4, an angle between an extending direction of the first strip electrodes and a row direction or a column direction of a pixel array of the display panel is β, where $0° \leq \beta \leq \text{Arctan}(9/2)$, which can avoid poor display phenomena of the display device such as Moire patterns generated during display; at this time, in order that the complete image information can be viewed by the user, preferably, a direction in which the sub-pixels for displaying one image of information are arranged is parallel to the extending direction of the first strip electrodes 26.

As shown in FIG. 2, the display panel 1 comprises a first polarizer 11, a second liquid crystal layer 12 and a second polarizer 13 arranged in order from its light entrance side to its light exit side, so that light emitted from the display panel 1 is linearly polarized light having a polarization direction parallel to a direction of light transmission axis of the second polarizer 13. In such as case, the control panel 2 may be a Twisted Nematic (short for TN) panel or an Optically Compensated Birefringence (short for OCB) panel.

Figure 5:
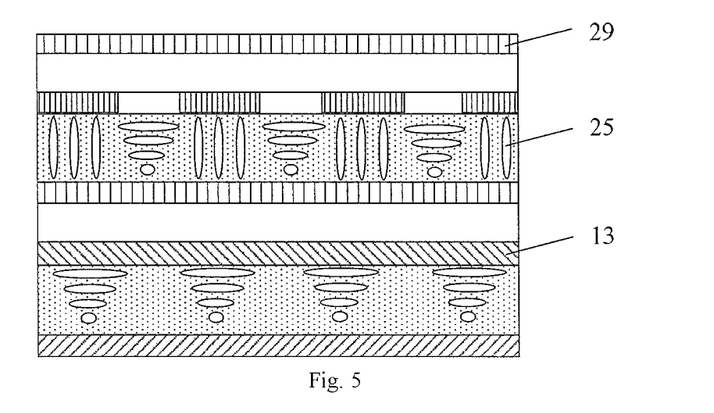
FIG. 5 is a sectional view showing another display device according to embodiments of the present invention.

Further, as shown in FIG. 5, the control panel 2 may further comprise a first quarter-wave plate 29 at its light exit side, and an angle between a direction of fast axis of the first quarter-wave plate 29 and a direction of light transmission axis of the second polarizer 13 is an acute angle. The linearly polarized light emitted from the first liquid crystal layer 25 becomes elliptically or circularly polarized light after passing through the first quarter-wave plate 29; in such a case, dedicated spectacles used with the display device comprises a quarter-wave plate and a polarizer (not shown) arranged in order from its light entrance side to its light exit side, so that the elliptically or circularly polarized light becomes linearly polarized light after passing through quarter-wave plate, and then the linearly polarized light is emitted towards the user after being filtered by the polarizer of the dedicated spectacles, thereby the image information displayed by the display device can be viewed by the user. Since, besides the polarizer, the dedicated spectacles are further provided with the quarter-wave plate, thereby also improving confidentiality during secrecy display of the display device.

Specifically, the angle between the direction of fast axis of the first quarter-wave plate 29 and the direction of light transmission axis of the second polarizer 13 may be 45° or an acute angle other than 45°.

When the angle between the direction of fast axis of the first quarter-wave plate 29 and the direction of light transmission axis of the second polarizer 13 is an acute angle other than 45°, the linearly polarized light emitted from the first liquid crystal layer 25 becomes circularly polarized light after passing through first quarter-wave plate 29; in such as case, it is necessary that the direction of fast axis of the quarter-wave plate of the dedicated spectacles is parallel to or perpendicular to the direction of fast axis of the first quarter-wave plate 29, so that the circularly polarized light emitted towards the dedicated spectacles can become linearly polarized light. In such as case, the user' head needs to be tilted during viewing, thereby resulting in a poor viewing effect.

When the angle between the direction of fast axis of the first quarter-wave plate 29 and the direction of light transmission axis of the second polarizer 13 is 45°, a direction to which the direction of fast axis of the first quarter-wave plate 29 is rotated clockwise or counterclockwise by 45° is the direction of light transmission axis of the second polarizer 13. The linearly polarized light emitted from the first liquid crystal layer 25 becomes circularly polarized light after passing through the first quarter-wave plate 29, and at this time, the circularly polarized light can become linearly polarized light after passing through the quarter-wave plate of the dedicated spectacles, no matter the direction of fast axis of the quarter-wave plate of the dedicated spectacles is parallel to or perpendicular to, or forms any random angle relative to, the direction of fast axis of the first quarter-wave plate 29. Since the direction of fast axis of the quarter-wave plate of the dedicated spectacles may form any random angle relative to the direction of fast axis of the first quarter-wave plate 29, it is not necessary that the direction of fast axis of the quarter-wave plate of the dedicated spectacles is held to be parallel to or perpendicular to the direction of fast axis of the first quarter-wave plate 29 when the user is viewing the image information displayed by the display device, thereby ensuring a good viewing effect for the user. Accordingly, it is preferable in embodiments of the present invention that the angle between the direction of fast axis of the first quarter-wave plate 29 and the direction of light transmission axis of the second polarizer 13 is 45°.

Embodiments of the present invention further provide a method of controlling the display device as described above. The method comprises: controlling the display panel to only display one image of information when the display panel is in the first display state, so that the display device performs normal display; and, when the display panel is in the second display state, controlling the display panel to display at least two images of information, and controlling the control panel so that a polarization direction of light emitted from the display panel after the light passes through the first regions is different from that of light emitted from the display panel after the light passes through the second regions, thereby the display device performs secrecy display, and thus the display device is switchable between the secrecy display and the normal display.

Embodiments of the present invention further provide dedicated spectacles used with the display device as described above, the dedicated spectacles being configured to only allow one of light passing through the first regions and light passing through the second regions to pass therethrough.

It is noted that the dedicated spectacles are suitable for the secrecy display of display device, and no dedicated spectacles are provided when the display device performs the normal display.

In one example, when the display panel displays at least two images of information, and when light passing through the first and second regions of the control panel and having different polarization direction reaches the dedicated spectacles, only one of light passing through the first regions and light passing through the second regions is allowed to pass through the dedicated spectacles, so that one image of information can be viewed by a user within a certain visible area by means of the dedicated spectacles, thereby achieving the secrecy display.

As described above, the display device has a plurality of configurations, and thus, specific configurations of the dedicated spectacles need to mate with those of the display device so that the dedicated spectacles can achieve the above functions. Exemplarily, embodiments of the present invention provide dedicated spectacles having the following configurations.

For purpose of easy understanding by those skilled in the art, adjustment operations of light performed by the Twisted Nematic panel and the Optically Compensated Birefringence panel are firstly described. For the Twisted Nematic panel, when no voltage is applied to liquid crystal molecules of the Twisted Nematic panel, the liquid crystal molecules are arranged in a horizontal spiral pattern, macroaxes of liquid crystal molecules at two ends being perpendicular to each other; at this time, linearly polarized light propagates along short axes of the liquid crystal molecules, and has turned its polarization direction to be perpendicular to its initial polarization direction after passing through liquid crystal molecules; when a voltage is applied to the liquid crystal molecules, the liquid crystal molecules are arranged with their macroaxes being perpendicular to planes where opposed surfaces of the first and second substrates are located; at this time, linearly polarized light propagates along macroaxes of the liquid crystal molecules and is not changed in its polarization direction after passing through liquid crystal molecules. For the Optically Compensated Birefringence panel, when no voltage is applied to liquid crystal molecules of the Optically Compensated Birefringence panel, the liquid crystal molecules are arranged in a symmetrical pattern with intermediate liquid crystal molecules being arranged to be parallel to the substrates and anterior and posterior liquid crystal molecules being deflected by symmetrical angles; the farther the anterior and posterior liquid crystal molecules are from the intermediate liquid crystal molecules, the larger the angles are; in such a case, linearly polarized light propagates along short axes of the liquid crystal molecules and is not changed in its polarization direction after passing through liquid crystal molecules; when a voltage is applied to the liquid crystal molecules, the liquid crystal molecules are arranged with their macroaxes being perpendicular to planes where opposed surfaces of the first and second substrates are located; at this time, linearly polarized light propagates along macroaxes of the liquid crystal molecules, and has turned its polarization direction to be perpendicular to its initial polarization direction after passing through liquid crystal molecules.

Of course, the control panel may be other types of panels, as long as the linearly polarized light passing through liquid crystal molecules in the state where a voltage is applied has a polarization direction which is different from that of the light in the state where no voltage is applied, which will be not repeated described in embodiments of the present invention.

Figure 6:
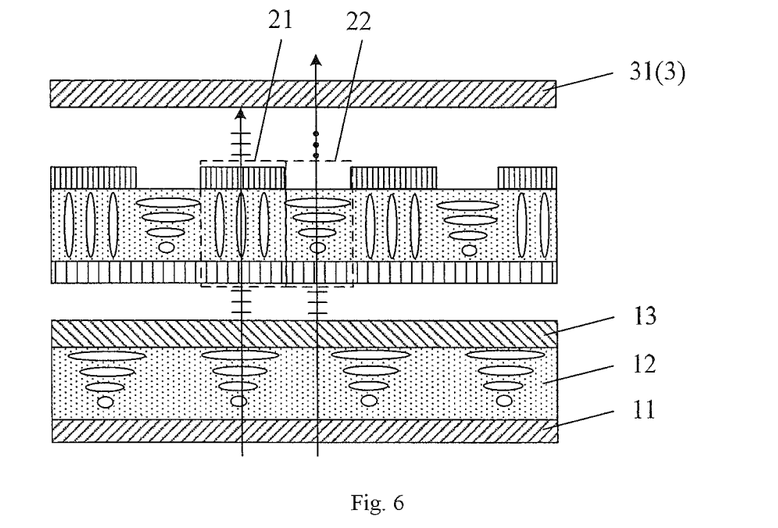
FIG. 6 is a sectional view showing a first exemplary arrangement of a display device and dedicated spectacles according to embodiments of the present invention.

In a first configuration, as shown in FIG. 6, when the display panel 1 comprises a first polarizer 11, a second liquid crystal layer 12 and a second polarizer 13 arranged in order from its light entrance side to its light exit side, and the control panel 2 is a Twisted Nematic panel and does not comprise any quarter-wave plate, the dedicated spectacles 3 comprises a third polarizer 31, a direction of light transmission axis of the third polarizer 31 being perpendicular to a direction of light transmission axis of the second polarizer 13. When the display panel 1 is in the second display state, that is, when it displays at least two images of information, a polarization direction of linearly polarized light emitted from the second polarizer 13 after the light passes through the first regions 21 is parallel to a direction of light transmission axis of the second polarizer 13, and is perpendicular to a direction of light transmission axis of the third polarizer 3, thus, light passing through the first regions 21 cannot pass through the third polarizer 31; a polarization direction of linearly polarized light emitted from the second polarizer 13 after the light passes through the second regions 22 is perpendicular to the direction of light transmission axis of the second polarizer 13, and is parallel to the direction of light transmission axis of the third polarizer 31, thus, light passing through the second regions 22 can pass through the third polarizer 31; accordingly, a combination of the control panel 2 and the dedicated spectacles 3 functions as a grating, so that only one image of information can be viewed by a user within a certain visible area through the dedicated spectacles 3, thereby achieving secrecy display.

Figure 7:
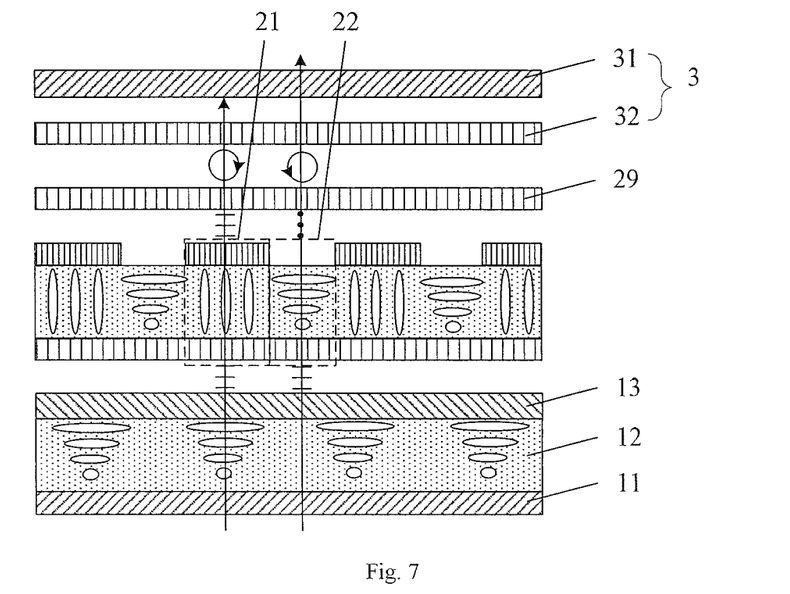
FIG. 7 is a sectional view showing a second exemplary arrangement of a display device and dedicated spectacles according to embodiments of the present invention.

In a second configuration, as shown in FIG. 7, when the display panel 1 comprises a first polarizer 11, a second liquid crystal layer 12 and a second polarizer 13 arranged in order from its light entrance side to its light exit side, the control panel 2 is a Twisted Nematic panel and comprises a first quarter-wave plate 29 at its light exit side, and a direction to which a direction of fast axis of first quarter-wave plate 29 is rotated clockwise by 45° is a direction of light transmission axis of the second polarizer 13, the dedicated spectacles 3 comprise a second quarter-wave plate 32 and a third polarizer 31 arranged in order from its light entrance side to its light exit side, and a direction to which a direction of fast axis of the second quarter-wave plate 32 is rotated counterclockwise by 45° is a direction of light transmission axis of the third polarizer 31. When the display panel 1 is in the second display state, that is, when the display panel 1 displays at least two images of information, linearly polarized light emitted from the second polarizer 13 has a polarization direction after passing through the first regions 21, which direction is parallel to a direction of light transmission axis of the second polarizer 13, and the light becomes right circularly polarized light after passing through the first quarter-wave plate 29, then the right circularly polarized light becomes linearly polarized light after passing through the second quarter-wave plate 32 of the dedicated spectacles 3, and a direction to which a direction of fast axis of the second quarter-wave plate 32 is rotated clockwise by 45° is a polarization direction of the linearly polarized light, thus, the polarization direction of the linearly polarized light is perpendicular to the direction of light transmission axis of third polarizer 31, thereby light passing through the first regions 21 cannot pass through third polarizer 31 and accordingly cannot pass through the dedicated spectacles 3; linearly polarized light emitted from the second polarizer 13 has a polarization direction after passing through the second regions 22, which direction is perpendicular to a direction of light transmission axis of the second polarizer 13, and the light becomes left circularly polarized light after passing through the first quarter-wave plate 29, then the left circularly polarized light becomes linearly polarized light after passing through the second quarter-wave plate 32 of the dedicated spectacles 3, and a direction to which the direction of fast axis of the second quarter-wave plate 32 is rotated counterclockwise by 45° is a polarization direction of the linearly polarized light, thus, the polarization direction of the linearly polarized light is parallel to the direction of light transmission axis of the third polarizer 31, thereby light passing through the second regions 22 can pass through third polarizer 31 and accordingly can pass through the dedicated spectacles 3; accordingly, a combination of the control panel 2 and the dedicated spectacles 3 functions as a grating, so that only one image of information can be viewed by a user within a certain visible area through the dedicated spectacles 3, thereby achieving secrecy display.

Figure 8:
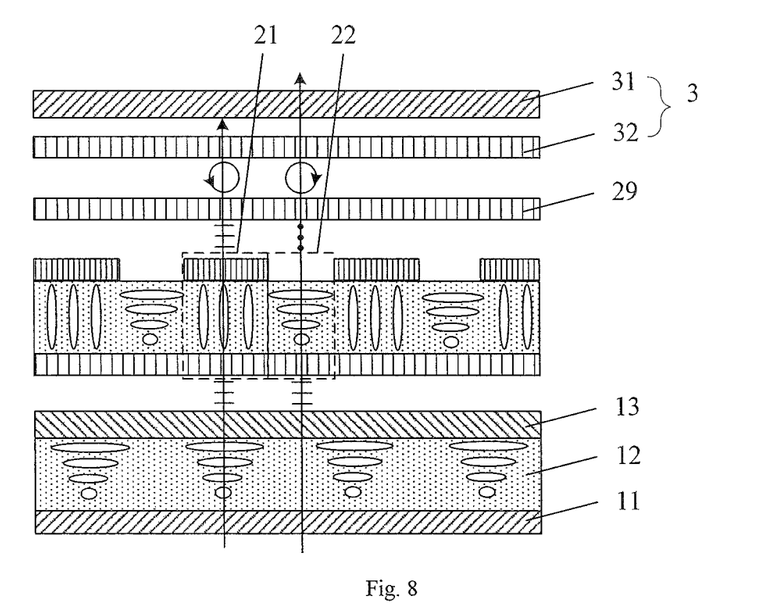
FIG. 8 is a sectional view showing a third exemplary arrangement of a display device and dedicated spectacles according to embodiments of the present invention.

In a third configuration, as shown in FIG. 8, when the display panel 1 comprises a first polarizer 11, a second liquid crystal layer 12 and a second polarizer 13 arranged in order from its light entrance side to its light exit side, the control panel 2 is a Twisted Nematic panel and comprises a first quarter-wave plate 29 at its light exit side, and a direction to which a direction of fast axis of first quarter-wave plate 29 is rotated counterclockwise by 45° is a direction of light transmission axis of the second polarizer 13, the dedicated spectacles 3 comprise a second quarter-wave plate 32 and a third polarizer 31 arranged in order from its light entrance side to its light exit side, and a direction to which a direction of fast axis of the second quarter-wave plate 32 is rotated clockwise by 45° is a direction of light transmission axis of the third polarizer 31. When the display panel 1 is in the second display state, that is, when the display panel 1 displays at least two images of information, linearly polarized light emitted from the second polarizer 13 has a polarization direction after passing through the first regions 21, which direction is parallel to a direction of light transmission axis of the second polarizer 13, and the light becomes left circularly polarized light after passing through the first quarter-wave plate 29, then the left circularly polarized light becomes linearly polarized light after passing through the second quarter-wave plate 32 of the dedicated spectacles 3, and a direction to which a direction of fast axis of the second quarter-wave plate 32 is rotated counterclockwise by 45° is a polarization direction of the linearly polarized light, thus, the polarization direction of the linearly polarized light is perpendicular to the direction of light transmission axis of third polarizer 31, thereby light passing through the first regions 21 cannot pass through third polarizer 31 and accordingly cannot pass through the dedicated spectacles 3; linearly polarized light emitted from the second polarizer 13 has a polarization direction after passing through the second regions 22, which direction is perpendicular to a direction of light transmission axis of the second polarizer 13, and the light becomes right circularly polarized light after passing through the first quarter-wave plate 29, then the right circularly polarized light becomes linearly polarized light after passing through the second quarter-wave plate 32 of the dedicated spectacles 3, and a direction to which the direction of fast axis of the second quarter-wave plate 32 is rotated clockwise by 45° is a polarization direction of the linearly polarized light, thus, the polarization direction of the linearly polarized light is parallel to the direction of light transmission axis of the third polarizer 31, thereby light passing through the second regions 22 can pass through third polarizer 31 and accordingly can pass through the dedicated spectacles 3; accordingly, a combination of the control panel 2 and the dedicated spectacles 3 functions as a grating, so that only one image of information can be viewed by a user within a certain visible area through the dedicated spectacles 3, thereby achieving secrecy display.

Figure 9:
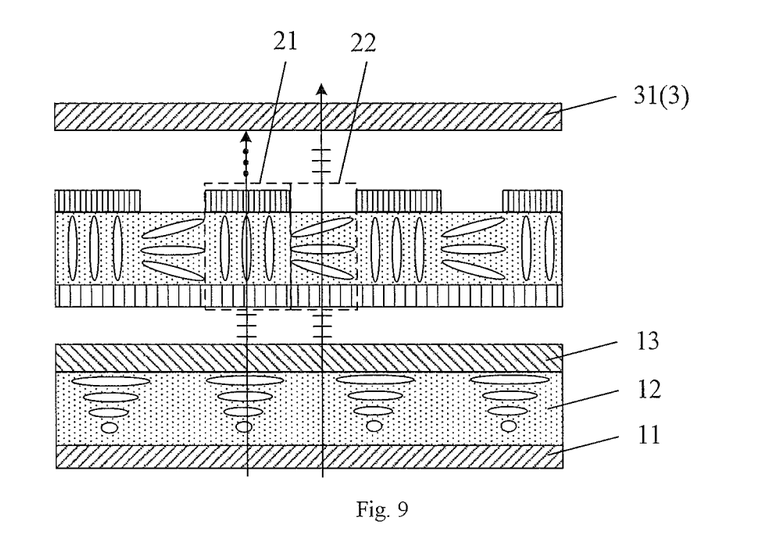
FIG. 9 is a sectional view showing a fourth exemplary arrangement of a display device and dedicated spectacles according to embodiments of the present invention.

In a fourth configuration, as shown in FIG. 9, when the display panel 1 comprises a first polarizer 11, a second liquid crystal layer 12 and a second polarizer 13 arranged in order from its light entrance side to its light exit side, and the control panel 2 is an Optically Compensated Birefringence panel and does not comprise any quarter-wave plate, the dedicated spectacles 3 comprise a third polarizer 31, a direction of light transmission axis of the third polarizer 31 being parallel to a direction of light transmission axis of the second polarizer 13. When the display panel 1 is in the second display state, that is, when the display panel 1 displays at least two images of information, linearly polarized light emitted from the second polarizer 13 has its polarization direction turned by 90° after passing through the first regions 21, so that its polarization direction is perpendicular to a direction of light transmission axis of the second polarizer 13 and is perpendicular to a direction of light transmission axis of the third polarizer 31, thus, light passing through the first regions 21 cannot pass through third polarizer 31; linearly polarized light emitted from the second polarizer 13 has its polarization direction unchanged after passing through the second regions 22, so that its polarization direction is parallel to the direction of light transmission axis of the second polarizer 13 and is parallel to the direction of light transmission axis of the third polarizer 31, thus, light passing through the first regions 21 can pass through third polarizer 31; accordingly, a combination of the control panel 2 and the dedicated spectacles 3 functions as a grating, so that only one image of information can be viewed by a user within a certain visible area through the dedicated spectacles 3, thereby achieving secrecy display.

Figure 10:
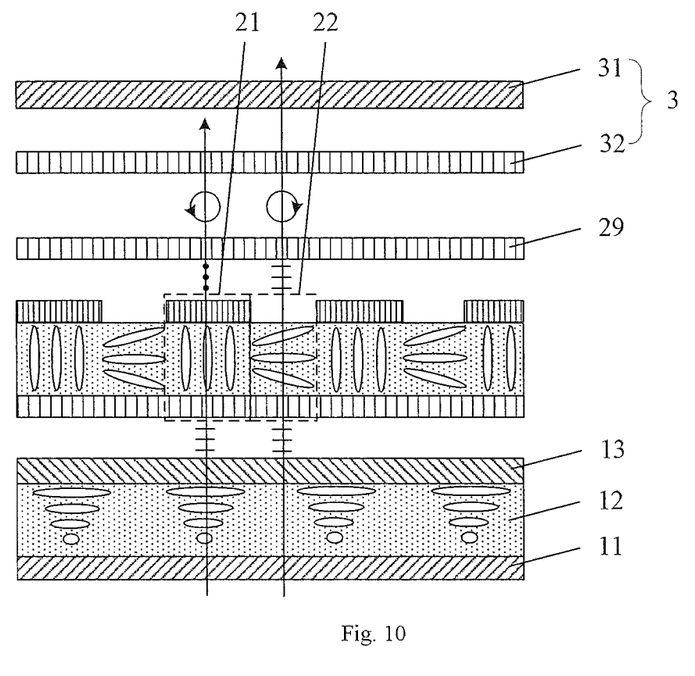
FIG. 10 is a sectional view showing a fifth exemplary arrangement of a display device and dedicated spectacles according to embodiments of the present invention.

In a fifth configuration, as shown in FIG. 10, when the display panel 1 comprises a first polarizer 11, a second liquid crystal layer 12 and a second polarizer 13 arranged in order from its light entrance side to its light exit side, and the control panel 2 is an Optically Compensated Birefringence panel and comprises a first quarter-wave plate 29 located at its light exit side, and a direction to which a direction of fast axis of first quarter-wave plate 29 is rotated clockwise by 45° is a direction of light transmission axis of the second polarizer 13, the dedicated spectacles 3 comprise a second quarter-wave plate 32 and a third polarizer 31 arranged in order from its light entrance side to its light exit side, and a direction to which a direction of fast axis of the second quarter-wave plate 32 is rotated clockwise by 45° is a direction of light transmission axis of the third polarizer 31. When the display panel 1 is in the second display state, that is, when the display panel 1 displays at least two images of information, linearly polarized light emitted from the second polarizer 13 has a polarization direction after passing through the first regions 21, which direction is perpendicular to a direction of light transmission axis of the second polarizer 13, and the light becomes left circularly polarized light after passing through the first quarter-wave plate 29, then the left circularly polarized light becomes linearly polarized light after passing through the second quarter-wave plate 32 of the dedicated spectacles 3, and a direction to which a direction of fast axis of the second quarter-wave plate 32 is rotated counterclockwise by 45° is a polarization direction of the linearly polarized light, thus, the polarization direction of the linearly polarized light is perpendicular to the direction of light transmission axis of third polarizer 31, thereby light passing through the first regions 21 cannot pass through third polarizer 31 and accordingly cannot pass through the dedicated spectacles 3; linearly polarized light emitted from the second polarizer 13 has a polarization direction after passing through the second regions 22, which direction is parallel to a direction of light transmission axis of the second polarizer 13, and the light becomes right circularly polarized light after passing through the first quarter-wave plate 29, then the right circularly polarized light becomes linearly polarized light after passing through the second quarter-wave plate 32 of the dedicated spectacles 3, and a direction to which the direction of fast axis of the second quarter-wave plate 32 is rotated clockwise by 45° is a polarization direction of the linearly polarized light, thus, the polarization direction of the linearly polarized light is parallel to the direction of light transmission axis of third polarizer 31, thereby light passing through the second regions 22 can pass through third polarizer 31 and accordingly can pass through the dedicated spectacles 3; accordingly, a combination of the control panel 2 and the dedicated spectacles 3 functions as a grating, so that only one image of information can be viewed by a user within a certain visible area through the dedicated spectacles 3, thereby achieving secrecy display.

Figure 11:
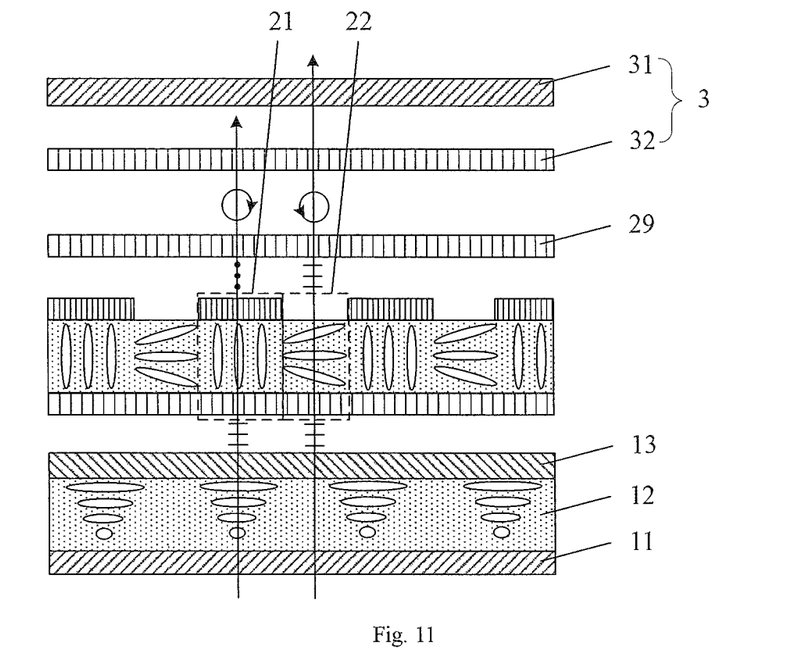
FIG. 11 is a sectional view showing a sixth exemplary arrangement of a display device and dedicated spectacles according to embodiments of the present invention.

In a sixth configuration, as shown in FIG. 11, when the display panel 1 comprises a first polarizer 11, a second liquid crystal layer 12 and a second polarizer 13 arranged in order from its light entrance side to its light exit side, and the control panel 2 is an Optically Compensated Birefringence panel and comprises a first quarter-wave plate 29 at its light exit side, and a direction to which a direction of fast axis of first quarter-wave plate 29 is rotated counterclockwise by 45° is a direction of light transmission axis of the second polarizer 13, the dedicated spectacles 3 comprise a second quarter-wave plate 32 and a third polarizer 31 arranged in order from its light entrance side to its light exit side, and a direction to which a direction of fast axis of the second quarter-wave plate 32 is rotated counterclockwise by 45° is a direction of light transmission axis of the third polarizer 31. When the display panel 1 is in the second display state, that is, when the display panel 1 displays at least two images of information, linearly polarized light emitted from the second polarizer 13 has a polarization direction after passing through the first regions 21, which direction is perpendicular to a direction of light transmission axis of the second polarizer 13, and the light becomes right circularly polarized light after passing through the first quarter-wave plate 29, then the right circularly polarized light becomes linearly polarized light after passing through the second quarter-wave plate 32 of the dedicated spectacles 3, and a direction to which of direction of fast axis of the second quarter-wave plate 32 is rotated clockwise by 45° is a polarization direction of the linearly polarized light, thus, the polarization direction of the linearly polarized light is perpendicular to the direction of light transmission axis of third polarizer 31, thereby light passing through the first regions 21 cannot pass through the third polarizer 31 and accordingly cannot pass through the dedicated spectacles 3; linearly polarized light emitted from the second polarizer 13 has a polarization direction after passing through the second regions 22, which direction is parallel to a direction of light transmission axis of the second polarizer 13, and the light becomes left circularly polarized light after passing through the first quarter-wave plate 29, then the left circularly polarized light becomes linearly polarized light after passing through the second quarter-wave plate 32 of the dedicated spectacles 3, and a direction to which the direction of fast axis of the second quarter-wave plate 32 is rotated counterclockwise by 45° is a polarization direction of the linearly polarized light, thus, the polarization direction of the linearly polarized light is parallel to the direction of light transmission axis of the third polarizer 31, thereby light passing through the second regions 22 can pass through the third polarizer 31 and accordingly can pass through the dedicated spectacles 3; accordingly, a combination of the control panel 2 and the dedicated spectacles 3 functions as a grating, so that only one image of information can be viewed by a user within a certain visible area through the dedicated spectacles 3, thereby achieving secrecy display.

Of course, other implementations may be obtained by those skilled in the art without creative work, based on the dedicated spectacles having the above six configurations, and are not repeated described in embodiments of the present invention.

Embodiments of the present invention further provide a display system, comprising the display device and the dedicated spectacles as described above.

In the above display system according to the embodiments of the present invention, since the display system comprises the display device and the dedicated spectacles as described above, the display panel only displays one image of information when the display panel is in the first display state, and the control panel is configured to allow light emitted from the display panel to pass therethrough, so that image information displayed by the display device can be identified by a user in his/her naked eye state, thereby normal display is achieved by the display device. The display panel displays at least two images of information when the display panel is in the second display state, and two adjacent sub-pixels located in the same row are configured to display different image information, so that no image information displayed by the display device can be identified by a user in his/her naked eye state; when the user wears the dedicated spectacles, only one of light passing through the first regions and light passing through the second regions can pass through the dedicated spectacles; in such a case, a combination of the dedicated spectacles and the control panel functions as a grating, so that one image of information can be viewed by the user within a certain visible area, thereby achieving secrecy display. Thus, the display device is switchable between the secrecy display and the normal display by switching the display panel between the first display state and the second display state.

Although several exemplary embodiments have been shown and described, the scope of the present invention is not limited to the specific forms described in the embodiments, and it would be appreciated by those skilled in the art that various changes or modifications may be made in these embodiments without departing from the principles and spirit of the disclosure, the changes or modifications falling within the scope of the disclosure. Thus, the scope of the present invention is defined in the claims and their equivalents.

What is claimed is:

1. A display device, comprising a display panel in which two adjacent sub-pixels located in the same row are configured to display different image information and from which light emitted is linearly polarized light, wherein,
the display panel is configured to be switchable between a first display state and a second display state, so that the display panel only displays one image of information when the display panel is in the first display state, and the display panel displays at least two images of information when the display panel is in the second display state;
the display device further comprises a control panel located at a light exit side of the display panel and configured to allow light emitted from the display panel to pass therethrough;
the control panel comprises first regions and second regions which are alternately arranged, and is configured so that when the display panel is in the second display state, a polarization direction of light emitted from the display panel after the light passes through the first regions is different from that of light emitted from the display panel after the light passes through the second regions; and
the display device comprises no polarizer at a light exit side of the control panel,
wherein
the control panel comprises a first substrate and a second substrate arranged to be opposed to each other, and a first liquid crystal layer between the first substrate and the second substrate,
the first substrate is located on a side of the first liquid crystal layer facing away from the display panel and provided thereon with transparent first strip electrodes having the same width and equidistantly arranged to be parallel to one another, regions where the first strip electrodes are provided corresponding to the first regions, gaps between the first strip electrodes corresponding to the second regions,
the second substrate is located on the other side of the first liquid crystal layer adjacent to the display panel and provided thereon with a transparent plate electrode, and
the control panel is configured so that when the display panel is in the second display state, a voltage applied to the first strip electrodes is different from that applied to the plate electrode, thereby liquid crystal molecules of the first liquid crystal layer within the first regions are arranged with their macroaxes being perpendicular to planes where opposed surfaces of the first substrate and the second substrate are located.

2. The display device according to claim 1, wherein
the control panel further comprises second strip electrodes arranged within the gaps between the first strip electrodes, the second strip electrodes having the same width and being equidistantly arranged to be parallel to one another; and
the control panel is further configured so that when the display panel is in the second display state, a voltage applied to the second strip electrodes is the same as that applied to the plate electrode, thereby liquid crystal molecules of the first liquid crystal layer within the second regions are arranged with their macroaxes parallel to the planes.

3. The display device according to claim 1, wherein
an angle between an extending direction of the first strip electrodes and a row direction or a column direction of a pixel array of the display panel is β, where $0° \leq \beta \leq \text{Arctan}(9/2)$; and a direction in which the sub-pixels for displaying one image of information are arranged is parallel to the extending direction of the first strip electrodes.

4. The display device according to claim 1, wherein
the display panel comprises a first polarizer, a second liquid crystal layer and a second polarizer arranged in order from its light entrance side to its light exit side; and
the control panel is a Twisted Nematic panel or an Optically Compensated Birefringence panel.

5. The display device according to claim 1, wherein
the display panel comprises a first polarizer, a second liquid crystal layer and a second polarizer arranged in order from its light entrance side to its light exit side; and
the control panel is Twisted Nematic panel or an Optically Compensated Birefringence panel.

6. The display device according to claim 4, wherein
the control panel further comprises a first quarter-wave plate located at its light exit side, and
an angle between a direction of fast axis of the first quarter-wave plate and a direction of light transmission axis of the second polarizer is an acute angle.

7. The display device according to claim 5, wherein
the control panel further comprises a first quarter-wave plate located at its light exit side, and
an angle between a direction of fast axis of the first quarter-wave plate and a direction of light transmission axis of the second polarizer is an acute angle.

8. The display device according to claim 6, wherein
the angle between the direction of fast axis of the first quarter-wave plate and the direction of light transmission axis of the second polarizer is 45°, and
a direction to which the direction of fast axis of the first quarter-wave plate is rotated clockwise or counterclockwise by 45° is the direction of light transmission axis of the second polarizer.

9. The display device according to claim 1, wherein one of the at least two images of information is used as image information for secrecy display, and other image information is used as interference image information.

10. The display device according to claim 1, wherein the display device has a plurality of visible areas, and the respective image information respectively correspond to different visible areas.

11. The display device according to claim 1, further comprising dedicated spectacles configured to only allow one of light passing through the first regions and light passing through the second regions to pass therethrough.

12. The display device according to claim 11, wherein when the display panel comprises a first polarizer, a second liquid crystal layer and a second polarizer arranged in order from its light entrance side to its light exit side and the control panel is a Twisted Nematic panel,
the dedicated spectacles comprise a third polarizer with a direction of light transmission axis being perpendicular to a direction of light transmission axis of the second polarizer.

13. Dedicated spectacles, used for a display device comprising a display panel from which linearly polarized light is emitted and a control panel located at a light exit side of the display panel and configured to allow light emitted from the display panel to pass therethrough, the control panel comprising first regions and second regions which are alternately arranged and being configured so that when the display panel displays at least two images of information, a polarization direction of light emitted from the display panel after the light passes through the first regions is different from that of light emitted from the display panel after the light passes through the second regions, the dedicated spectacles being configured to only allow one of light passing through the first regions and light passing through the second regions to pass therethrough, wherein when the display panel comprises a first polarizer, a second liquid crystal layer and a second polarizer arranged in order from its light entrance side to its light exit side and the control panel is a Twisted Nematic panel and comprises a first quarter-wave plate located at its light exit side and a direction to which a direction of fast axis of the first quarter-wave plate is rotated clockwise by 45° is a direction of light transmission axis of the second polarizer, the dedicated spectacles comprise a second quarter-wave plate and a third polarizer arranged in order from its light entrance side to its light exit side, and a direction to which a direction of fast axis of the second quarter-wave plate is rotated counterclockwise by 45° is a direction of light transmission axis of the third polarizer, or wherein when the display panel comprises a first polarizer, a second liquid crystal layer and a second polarizer arranged in order from its light entrance side to its light exit side and the control panel is a Twisted Nematic panel and comprises a first quarter-wave plate located at its light exit side, and a direction to which a direction of fast axis of the first quarter-wave plate is rotated counterclockwise by 45° is a direction of light transmission axis of the second polarizer, the dedicated spectacles comprise a second quarter-wave plate and a third polarizer arranged in order from its light entrance side to its light exit side, and a direction to which a direction of fast axis of the second quarter-wave plate is rotated clockwise by 45° is a direction of light transmission axis of the third polarizer.

14. The display device according to claim 11, wherein when the display panel comprises a first polarizer, a second liquid crystal layer and a second polarizer arranged in order from its light entrance side to its light exit side and the control panel is an Optically Compensated Birefringence panel,
the dedicated spectacles comprise a third polarizer with a direction of light transmission axis being parallel to a direction of light transmission axis of the second polarizer.

15. Dedicated spectacles, used for a display device comprising a display panel from which linearly polarized light is emitted and a control panel located at a light exit side of the display panel and configured to allow light emitted from the display panel to pass therethrough, the control panel comprising first regions and second regions which are alternately arranged and being configured so that when the display panel displays at least two images of information, a polarization direction of light emitted from the display panel after the light passes through the first regions is different from that of light emitted from the display panel after the light passes through the second regions, the dedicated spectacles being configured to only allow one of light passing through the first regions and light passing through the second regions to pass therethrough, wherein when the display panel comprises a first polarizer, a second liquid crystal layer and a second polarizer arranged in order from its light entrance side to its light exit side and the control panel is an Optically Compensated Birefringence panel and comprises a first quarter-wave plate located at its light exit side and a direction to which a direction of fast axis of the first quarter-wave plate is rotated clockwise by 45° is a direction of light transmission axis of the second polarizer, the dedicated spectacles comprise a second quarter-wave plate and a third polarizer arranged in order from its light entrance side to its light exit side, and a direction to which a direction of fast axis of the second quarter-wave plate is rotated clockwise by 45° is a direction of light transmission axis of the third polarizer, or wherein when the display panel comprises a first polarizer, a second liquid crystal layer and a second polarizer arranged in order from its light entrance side to its light exit side and the control panel is an Optically Compensated Birefringence panel and comprises a first quarter-wave plate located at its light exit side and a direction to which a direction of fast axis of the first quarter-wave plate is rotated counterclockwise by 45° is a direction of light transmission axis of the second polarizer, the dedicated spectacles comprise a second quarter-wave plate and a third polarizer arranged in order from its light entrance side to its light exit side, and a direction to which a direction of fast axis of the second quarter-wave plate is rotated counterclockwise by 45° is a direction of light transmission axis of the third polarizer.

16. A display system, comprising the display device according to claim 1 and the dedicated spectacles according to claim 13.

17. A method of controlling the display device according to claim 1, the method comprising:
  controlling the display panel to only display one image of information when the display panel is in the first display state, so that the display device performs normal display; and
  when the display panel is in the second display state, controlling the display panel to display at least two images of information, one of which is used as image information for secrecy display, and others are used as interference image information, and controlling the control panel so that a polarization direction of light emitted from the display panel after the light passes through the first regions is different from that of light emitted from the display panel after the light passes through the second regions, thereby the display device performs secrecy display.

18. A display system, comprising the display device according to claim 1 and the dedicated spectacles according to claim 15.

* * * * *